April 8, 1958 L. H. MORIN 2,829,400
METHOD FOR PRODUCING FOAMED PLASTIC SPOOLS
Filed Sept. 15, 1954 2 Sheets-Sheet 1
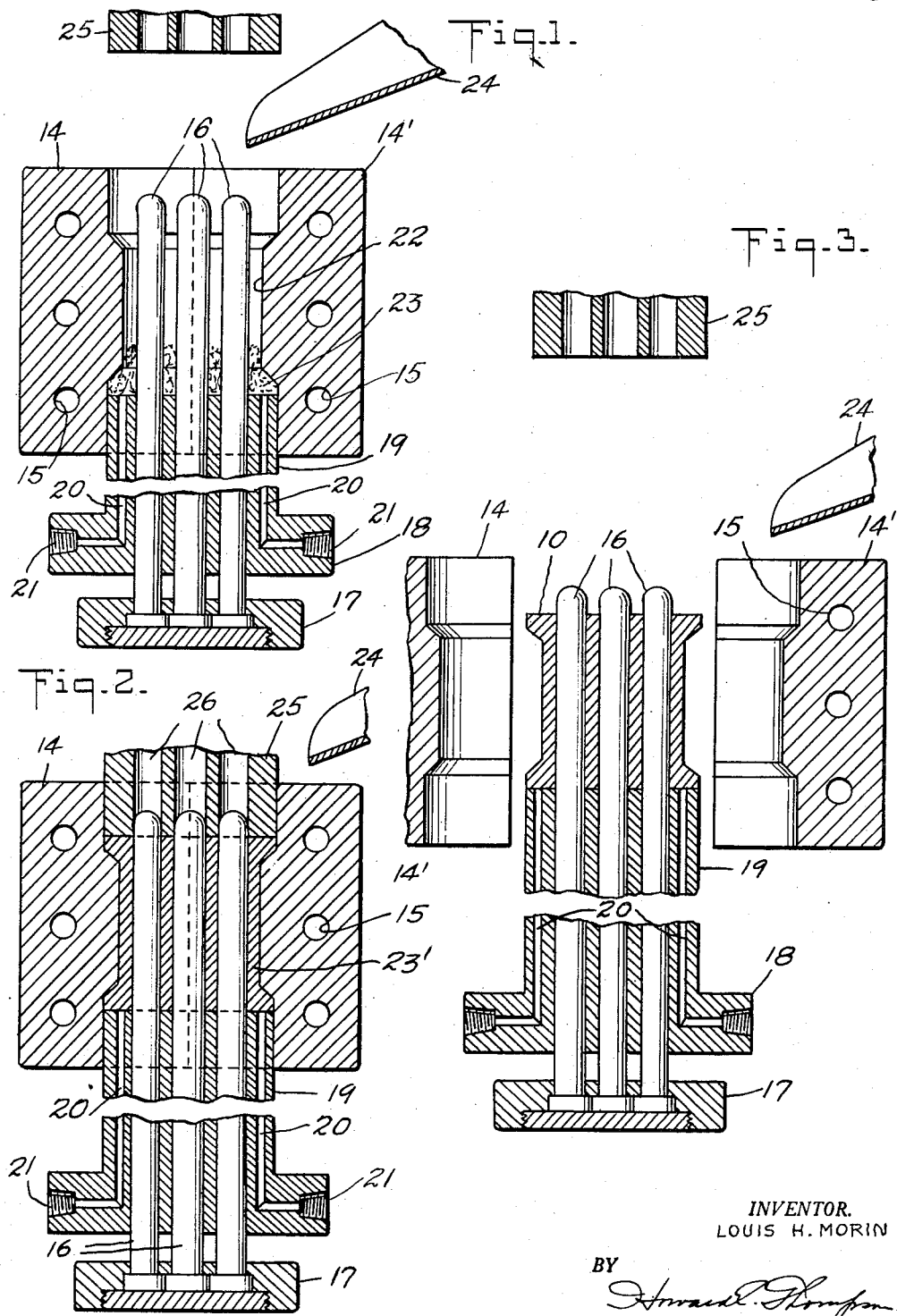
INVENTOR.
LOUIS H. MORIN
BY
ATTORNEY April 8, 1958   L. H. MORIN   2,829,400
METHOD FOR PRODUCING FOAMED PLASTIC SPOOLS
Filed Sept. 15, 1954   2 Sheets-Sheet 2

INVENTOR.
LOUIS H. MORIN
BY
ATTORNEY

United States Patent Office 2,829,400
Patented Apr. 8, 1958

2,829,400

METHOD FOR PRODUCING FOAMED PLASTIC SPOOLS

Louis H. Morin, Bronx, N. Y., assignor to Coats & Clark Inc., New York, N. Y., a corporation of Delaware Application September 15, 1954, Serial No. 456,239

1 Claim. (Cl. 18—34)

This invention relates to the production of plastic spools. More particularly, the invention deals with a method for producing articles of manufacture of this type and kind from foamable plastic material.

Still more particularly, the invention deals with a method of producing spools of economical material of the kind defined, wherein rims of stronger material are applied.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic sectional view through dies and core members utilized in forming spools according to my invention.

Fig. 2 is a view, similar to Fig. 1, showing the parts in a different position.

Fig. 3 is a view, similar to Figs. 1 and 2, showing the dies open, preparatory to ejecting the moulded spool from the machine.

In the production of thread spools generally of the kind under consideration, the same have been moulded from rather expensive plastic materials to give the required strength and rigidity thereto and, in such procedures, the spool bodies have been made of thin walled construction throughout.

My present invention deals with the formation of a more economical type of moulded spool body, wherein what are generally known as foamable plastic materials are employed, thus materially reducing the cost of the spools while, at the same time, providing a spool body having sufficient strength and durability to serve normal uses thereof.

My invention also includes the addition of rims of a harder or stronger plastic material to the ends of the spool body, in which latter event a minimum amount of the more expensive plastic is employed. It will be apparent that the spools may be made with any type and kind of coring and, in the present disclosure, I have illustrated, by way of example, one simple form of coring of the spool body to minimize the overall weight of the spool and the amount of material employed.

Figure 4:
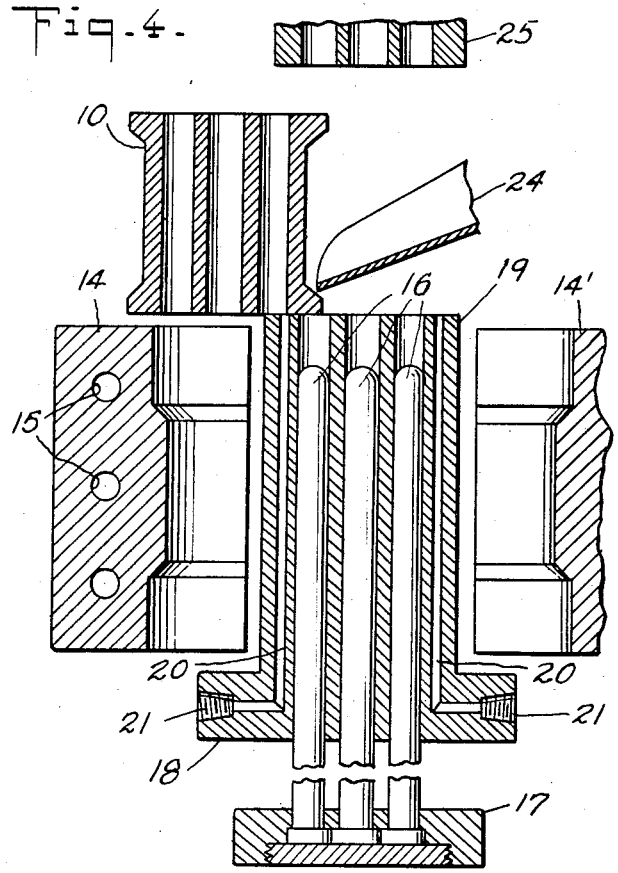
Fig. 4 is a view, similar to Fig. 3, illustrating the operation of ejecting the moulded spool from the machine.
Figure 5:
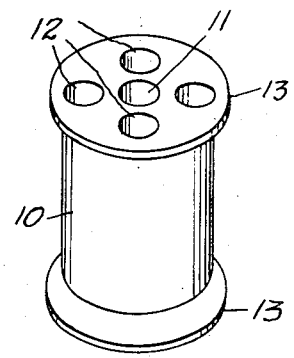
Fig. 5 is a perspective view of a spool made according to my invention.

In Figs. 1 to 4, inclusive, I have diagrammatically shown die and core structures for producing spools of the type and kind shown in perspective in Fig. 5 of the drawing, wherein the spool body 10 has, in addition to the central longitudinal bore 11, four circumferentially spaced bores 12 to lighten the spool body and at 13 are shown the more or less conventional rim ends on the spool body.

In carrying my invention into effect, I provide a pair of relatively movable dies 14, 14', the dies having circulating apertures, as at 15, for circulating steam or hot air in heating the dies and, at the same time, cooling agents can be circulated through the passages for setting or hardening the moulded spool.

Arranged within the dies 14, 14', when in closed position, are a plurality of cores 16 in the form of long round pins, these being spaced to form the apertures 11 and 12 in the resulting spool, as shown in Fig. 5 of the drawing. These pins are collectively mounted upon a head 17 which is arranged below the cross-head 18 of an ejector 19. The cores or pins 16 are movable through the ejector 19 and the ejector has two or more circulating passages 20 with threaded ends, as at 21, for coupling of pipes or tubes therewith for the introduction of air or steam into the mould cavity 22 of the dies and into material 23 deposited in the cavity in a predetermined measured quantity, the deposit being delivered through a trough or chute 24.

At 25 is shown an upper plunger which, in conjunction with the ejector 19, forms end wall portions of the cavity 22 when the parts are in the normal closed position, as indicated in Fig. 2 of the drawing. In this connection, it will be noted that the plunger 25 is apertured, as seen at 26, to receive the ends of the core pins 16. When the parts are in the position shown in Fig. 2 of the drawing, steam or air will be injected into the material 23 to foam this material, while being subjected to heat introduced through the circulating passages 15, thus forming the resulting moulded spool product 23', as noted in Fig. 2 of the drawing.

After a predetermined period of time, a cooling agent is then circulated through the passages 15 to chill and set the moulded product 23 to form the resulting moulded spool, these operations being performed after discontinuation of the injection of steam or air through the passages 20.

Upon setting of the moulded spool, the plunger 25 is raised and the dies 14, 14' are separated, as diagrammatically illustrated in Fig. 3 of the drawing, whereupon, the ejector 19 moves upwardly to dispose the upper end of the ejector 19 above the upper surfaces of the dies 14, 14', after which, the trough 24, which has been in a retracted position as noted in Figs. 2 and 3, is now advanced to move the moulded spool 10 over the upper surface of the dies and to displace the same from the dies into a suitable receptacle.

Upon completing this operation, the trough 24 is returned to the position shown in Fig. 1; the ejector 19 is lowered and the dies closed, returning the parts to the position shown in Fig. 1; whereupon, the above cycle of operation is repeated.

Figure 6:
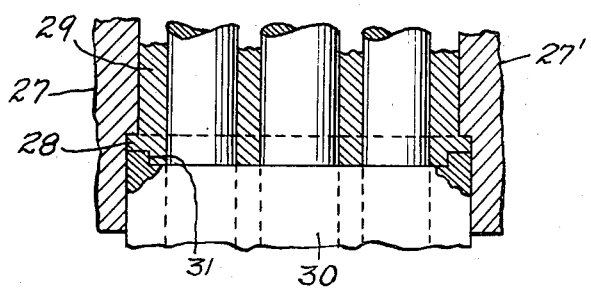
Fig. 6 is a view, similar to Fig. 2, illustrating part of the construction in elevation and showing a modified form of die and core structure.
Figure 7:
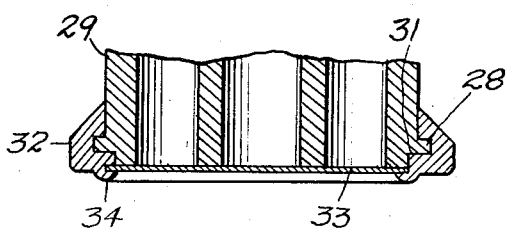
Fig. 7 is a sectional detailed view of one end portion of a rimmed spool, the spool body of which is made in accordance with the teachings in Fig. 6 of the drawing.

In Figs. 6 and 7 of the drawing, I have shown a modified adaptation of my invention. In Fig. 6, the dies 27, 27' are slightly modified in form with respect to the dies 14, 14', so as to provide abrupt and small shoulder portions 28 on the resulting moulded spool 29. In like manner, the ejector 30 differs from the ejector 19 in simply shaping the projection 28 so as to form a groove or recess 31 in the outer surface of the spool body. The purpose of this construction is to provide means for anchorage of a moulded plastic rim 32 upon the projection 28, as well as to enter the recess 31, as clearly noted in Fig. 7 of the drawing. The rim 32 can be moulded of a stronger and more expensive material and is applied to the spool body 29 in accordance with the teachings in my prior application, Serial Number 442,140 filed July 8, 1954.

In Fig. 7, I have indicated at 33 a label end for the spool body which is held in position by an integral annular flange portion 34 on the rim 32. The flange portion 34 can be directly moulded in the position shown or can be formed or shaped into such position in accordance with the teachings in said earlier application.

In addition to materially strengthening the rimmed ends of a spool by the mounting of the rims 32 thereon, as shown in Fig. 7, this method of procedure is also desirable from the standpoint of applying a predetermined color to the rim ends which would blend with or be in harmony with the thread upon the spool. It will be understood in this connection that the spool body proper can be made of a single base color or neutral color, which would not affect in any way the application of the thread thereon.

A further advantage of rims 32 is that they can be nicked to provide thread holding nicks resistant to breaking or chipping off. Good nicks can also be provided in the spool of Fig. 5. Labels may be conventionally mounted on the latter spool.

The preferred foamable plastic material is one incorporating its own gas-generating agent, the plastic and the agent being mixed together in subdivided form and being available as a dry mixture. Heating of the mixture not only fuses the plastic but also promotes the formation and distribution of gas throughout the fused plastic. A preferred plastic is polystyrene; others that may be used include, for example, cellulose acetate and other cellulosics, polyethylene, vinyl resins like polyvinyl chloride, etc., including mixtures of these and other plastics. If it is desired to employ a thermosetting plastic like phenolic resin, the cooling step is omitted and the resin is hardened by heating. Gas-generating agents comprise compounds that react to produce gas; usually they comprise heat-decomposable compounds such as ammonium bicarbonate, ammonium nitrite, and the like. The amount of plastic material charged to the die cavity is variable to some extent, but it should be sufficient to produce a substantially rigid structure. The plastic material may also be one which is foamed by the introduction to the fused plastic of external gases like air, nitrogen, carbon dioxide, dry steam, etc.

Heating of the plastic material in the die cavity may be performed indirectly by passing a heating medium like steam, hot air or other hot gas through passages 15 of the dies or by suitably heating the outside of the dies as by electrical or radio frequency heating means. It is desirable to employ temperature control means to regulate the heating. A combination of indirect and direct heating may be employed, the former being as described, and the latter comprising passing a heating medium like hot air, dry steam, or other hot gas through passages 20 of the ejector. In some cases the latter method may be used by itself. Where a plastic is used which is foamed by the introduction of external gas, the heating gas sent through passages 20 may be made to serve as a foaming gas.

Where a gas is introduced to the die cavity through passages 20, any excess gas pressure is relieved by venting the gas through the spaces between plunger 25 and dies 14, 14', these spaces being normally present as a result of an imperfect fit of the plunger in the end opening of the die cavity.

A preferred procedure is to heat the plastic material indirectly by heating the dies and to employ a material incorporating its own gas-generating agent, thus avoiding any occasion for venting gas from the die cavity; the gas produced in the latter type of material is retained by the fused plastic, being caught and held in a multiplicity of small cavities formed in the plastic and does not tend to accumulate to an extent requiring venting, although venting is possible, as described. In this preferred procedure the ejector 19 is replaced by one in which the passages 20 are absent, or are suitably sealed off at their inner or discharge ends, to avoid having fused plastic flow into the passages.

Summarizing the method, it will be seen to comprise the steps of adding foamable plastic material through an end opening of the die cavity to partially fill the cavity; sealing the cavity by moving an end stop piece, such as the ram 25, into the end opening; heating the plastic material, preferably by applying heat to the dies, to fuse the plastic while coincidently distributing a gas through the fused plastic to expand the latter so that it fills the cavity; and solidifying the shaped article. As noted, the material preferably incorporates a gas-generating agent so as to produce the gas in situ. The fused expanded plastic is shaped or molded into the form of the die cavity, which is that of a spool, as shown in Figs. 1–4, or of a spool body having rim-engaging means on each end, as shown in Figs. 6–7. The fused expanded plastic is solidified by cooling, cold water or a liquid refrigerant being passed through apertures 15 of the dies for this purpose. If the plastic is thermosetting rather than thermoplastic, then the cooling step is omitted and hardening is accomplished in the conventional way. The solidified spool or spool body has a substantially rigid, cellular structure by virtue of the formation therein of a multiplicity of small gas-containing cavities comprising closed cells which are distributed throughout the structure and which retain the gas. The end stop piece and the dies are then withdrawn from the molded article and the latter is ejected from the core members 16 by moving the end piece 19 relatively to the core members. If a spool body such as 29 is formed, there is then cast on each end of it in a separate step an annular plastic rim interlocked with the rim-engaging means 28.

Spools produced as described are lighter in weight than those made of unfoamed plastic and provide economies by requiring less material.

Having fully described my invention, what I claim as new and desire to secure by Letters Patent is:

The method of forming a thread spool of foamed plastic by molding the same in the cavity of a pair of relatively movable dies which when closed form a substantially cylindrical cavity, said dies having end openings sealable by a pair of oppositely disposed movable end pieces adapted in cooperation with said dies to form a rim retaining shoulder portion recess at each end of said die cavity, one end piece having a core member slidably engageable therewith and extending into the die cavity and the other end piece serving as an end wall of said cavity and apertured to receive the end portions of said core member, which comprises adding foamable plastic material through an end opening of the cavity to partially fill said cavity, sealing the cavity, heating the plastic material to fuse the plastic by distributing a hot gas through the fused plastic to expand the latter so that it fills said cavity, said fused expanded plastic being thereby molded into the form of a spool body having rim-engaging means on each end thereof, cooling the fused expanded plastic to solidify the same into said spool body form, said solidified spool body having a substantially rigid, cellular structure by virtue of the formation, distribution and retention therein of a multiplicity of small gas-containing cavities, withdrawing said end stop piece and the dies from the molded spool body, ejecting the spool body from the core member by moving said one end piece relatively to said core member, and casting on each end of the spool body an annular plastic rim interlocked with said rim-engaging means to form said spool.

(References on following page)

References Cited in the file of this patent

UNITED STATES PATENTS

| | | |
|---|---|---|
| 2,130,254 | Visman | Sept. 13, 1938 |
| 2,297,022 | Pfleumer | Sept. 29, 1942 |
| 2,310,830 | Blair et al. | Feb. 9, 1943 |
| 2,358,962 | Cunningham | Sept. 26, 1944 |
| 2,394,122 | Urmston | Feb. 5, 1946 |
| 2,424,047 | Morin | July 15, 1947 |
| 2,512,535 | Wiltshire et al. | June 20, 1950 |
| 2,582,922 | Crowley et al. | Jan. 15, 1952 |

FOREIGN PATENTS

| | | |
|---|---|---|
| 527,951 | Great Britain | Oct. 18, 1940 |